(12) United States Patent
Archibald et al.

(10) Patent No.: US 6,596,178 B1
(45) Date of Patent: Jul. 22, 2003

(54) FLUID PURIFICATION SYSTEM

(75) Inventors: Guy Archibald, Tacoma, WA (US); Fred Hayes, Littleton, CO (US)

(73) Assignee: Hydro Development LLC, Boulder, CO (US)

( * ) Notice: Subject to any disclaimer, the term of this patent is extended or adjusted under 35 U.S.C. 154(b) by 62 days.

(21) Appl. No.: 10/029,661

(22) Filed: Dec. 18, 2001

(51) Int. Cl.[7] .............................. F24C 9/00; B01D 1/00; C02F 1/02
(52) U.S. Cl. .................. 210/774; 210/180; 210/181; 210/258; 126/247; 122/26
(58) Field of Search ............................ 210/774, 787, 210/175, 179, 180, 181, 252, 259, 258; 126/247; 122/26

(56) References Cited

U.S. PATENT DOCUMENTS

| | | | | | |
|---|---|---|---|---|---|
| 3,026,261 A | * | 3/1962 | Mayfield et al. | ............ | 210/713 |
| 3,425,235 A | * | 2/1969 | Cox | ............ | 62/537 |
| 4,664,068 A | * | 5/1987 | Kretchmar et al. | ............ | 122/26 |
| 5,188,090 A | | 2/1993 | Griggs | | |
| 5,385,298 A | | 1/1995 | Griggs | | |
| 5,957,122 A | | 9/1999 | Griggs | | |
| 5,979,435 A | * | 11/1999 | Puett, Jr. | ............ | 126/247 |
| 6,164,274 A | * | 12/2000 | Giebeler et al. | ............ | 126/247 |

* cited by examiner

Primary Examiner—Fred Prince
(74) Attorney, Agent, or Firm—James G. O'Neill; Klein, O'Neill& Singh, LLP

(57) ABSTRACT

A system for cleaning, heating and purifying contaminated aqueous solutions. The system utilizes a separator having a wheel with staggered orifices of different diameters and depths. The wheel is tightly held within a housing and is mounted on a rotating shaft. The shaft is held by sealed bearing assemblies. The shaft is rotated by an external electromotive devise. The aqueous solution is transported to the separator via preheat and circulation tanks by use of a pump, and passes to a storage container where it may be utilized for many purposes, via a pair of heat exchangers, a venturi and a second pump.

20 Claims, 2 Drawing Sheets

FLUID PURIFICATION SYSTEM

BACKGROUND OF THE INVENTION

1. Field of the Invention

This invention generally relates to fluid purification systems, and more particularly, to an improved and more efficient system for separating impurities from an aqueous solution utilizing a rotating separator and a vacuum.

2. Description of the Prior Art

It is well known that water and other fluids must be filtered or treated so as to separate and remove entrained impurities in order to render the impure water safe and/or useable. Various techniques and processes have heretofore been employed in order to purify water. In particular, reverse osmosis systems are the preferred method of purifying aqueous solutions.

Additionally, U.S. Pat. Nos. 5,188,090, 5,385,298 and 5,957,122 to Griggs disclose apparatus having rotors therein for heating water in a system. The disclosed apparatus all utilize cylindrical rotors, having a plurality of bores whose depth preferably exceeds their diameter, rotatable in a C-faced housing by an external power source, such as an electrical motor.

While the use of reverse osmosis systems provide clean or purified water, they have to be cleaned and/or maintained frequently, and tend to be expensive to own and operate. And, while the apparatus for heating fluids in the Griggs '090, '298 and '122 patents do produce heated water, they do not work efficiently in producing purified water, nor do they produce heated or purified water in sufficient quantities to be used in anything except small or low capacity systems, such as residential hot water systems.

The present invention provides improvements in purifying larger quantities of water and other aqueous solutions in a more efficient and productive manner. This is accomplished by utilizing a system having a vacuum drawn therein and by using a separator having a cylindrical rotor or wheel with a plurality of different sized orifices formed therein and spaced uniformly around an outer surface thereof. The rotor or wheel is held in a housing and mounted on a shaft held in bearing assemblies and is rotated at high speed to cause fluid in the housing to be sheared off at the molecular level. This shearing action separates the clean and purified fluid from the impurities. And any impurities in the fluid are pumped out of the system, while the purified fluid is pumped to a holding tank by a vacuum system, for use as needed. The heat produced during this process aids in purification of the fluid, and is used to aid in preheating incoming, unpurified fluid to the system.

Therefore, it can be seen that the present invention meets an existing need in the art for the improved and more efficient system for purifying aqueous solutions, as well as the production of large quantities of purified water, or the like, in a controlled manner.

SUMMARY OF THE INVENTION

Accordingly, It is a general object of the present invention to provide an improved system for purifying fluids. It is a particular object of the present invention to provide an improved system for more efficiently purifying aqueous solutions utilizing a vacuum system. It is another particular object of the present invention to provide an improved separator having a rotor with a plurality of uniformly spaced, different sized orifices formed therein. It is yet another particular object of the present invention to provide an improved system for achieving substantially improved through-put of purified water by utilizing a vacuum. And, it is a further particular object of the present invention to provide an improved method and system for purifying water having a more efficient separator with a rotating wheel used in conjunction with a vacuum, and a plurality of tanks and pumps to efficiently purify large quantities of water.

These and other objects and advantages of the present invention are achieved by providing a system for purifying fluid comprised of a circulation tank, a separator operated by an electric motor, a preheat fluid tank, a system to form a vacuum and a purified product holding tank. Incoming fluid is first drawn into the preheat fluid tank and then to the circulation tank, after which it is drawn into the separator where it is purified before being drawn through a venturi and into the purified fluid holding tank. In a second embodiment of the present invention there is provided a system utilizing a known separator or heat pump to greatly increase the efficiency and production of purified fluid.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in conjunction with the accompanying drawings, wherein:

DESCRIPTION OF THE PREFERRED EMBODIMENTS

Figure 1:
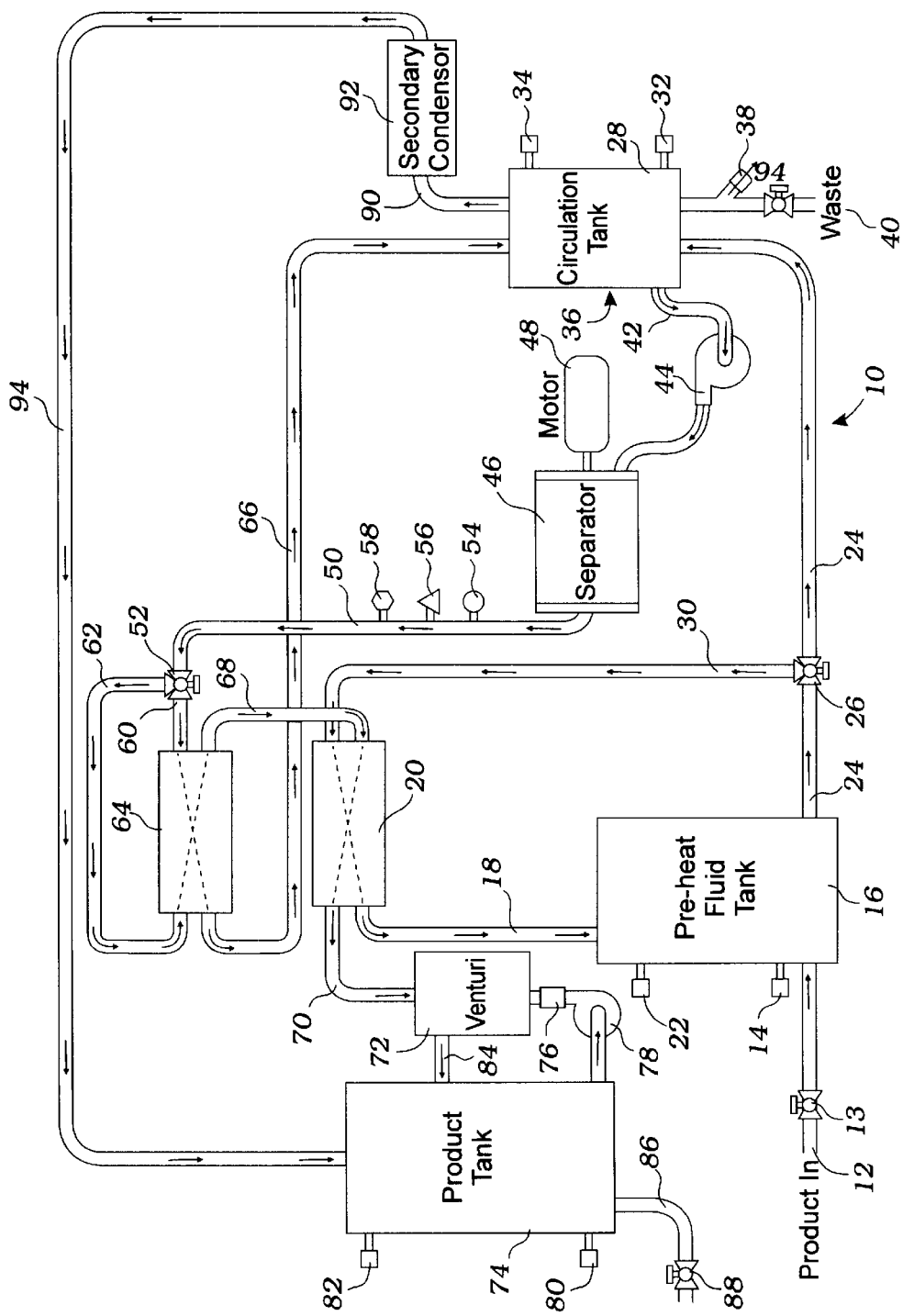
FIG. 1 is a schematic representation of a preferred embodiment of the fluid purification system of the present invention.

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide for an improved and simplified fluid purification method and system. Although the present invention may be utilized with any aqueous solution, it is described in connection with the purification of impure or polluted water, for sake of convenience only, and not by way of limitation.

Referring now to the drawings, the system of the present invention is generally shown at 10. The system 10 is supplied with raw or polluted aqueous solution or water at line 12 through a control valve 13, preferably operated by a solenoid that is activated to open the valve by a low level sensor or switch 14 in a pre-heat fluid tank 16. The raw aqueous solution flows into the pre-heat tank 16, where it is mixed with fluid from line 18 coming from a first outlet of a second heat exchanger 20. Once the fluid in pre-heat tank 16 reaches a predetermined height, it activates a high level sensor or switch 22, which deactivates or closes valve 13.

The fluid is drawn from an outlet in the pre-heat tank 16 via line 24 connected to an inlet of a first three-way valve 26, which valve is preferably solenoid operated. Line 24 then continues from a first outlet of the three-way valve 26 to a circulation tank 28. A further line 30 is connected to a second outlet of three-way valve 26 and leads to a first inlet in the second heat exchanger 20 to pass fluid through the second heat exchanger and out the first outlet to line 18. The three-way valve 26 is activated to feed aqueous solution from pre-heat tank 10 to the circulation tank 28 by a low level sensor or switch 32 and is shut off by a high level switch 34 in the circulation tank. The circulation tank 28 also includes a conductivity sensor or switch 36 to check the conductivity of the aqueous solution in the circulation tank.

The circulation tank 28 includes a plurality of outlets including one to a strainer 38 and a waste valve 40, preferably solenoid operated, connected thereto, to filter out and send away waste from the system and an outlet leading to line 90, as explained more fully below.

Figure 2:
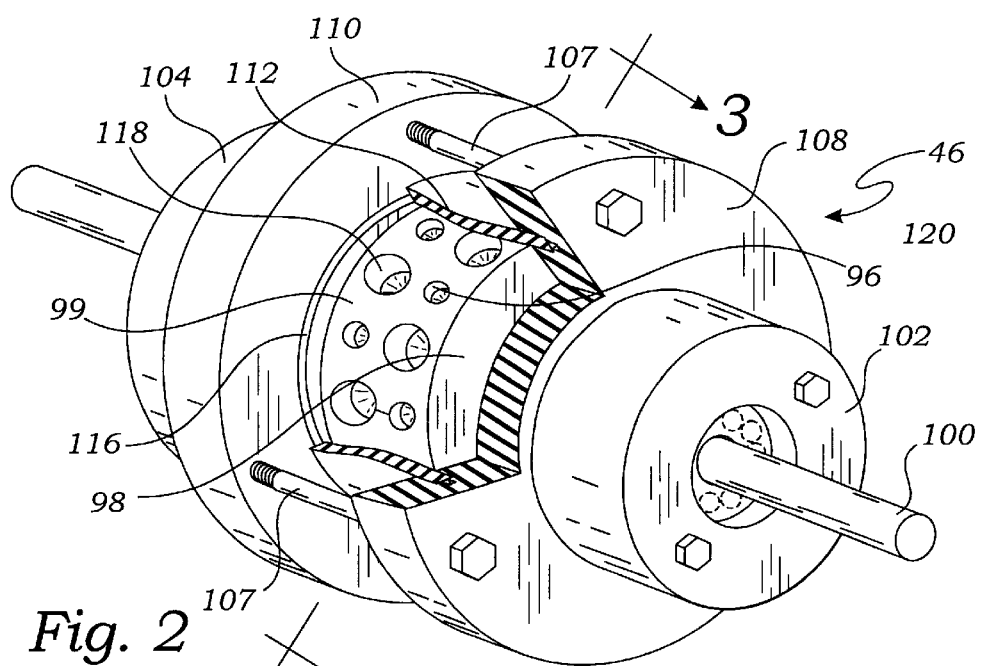
FIG. 2 is a perspective view partly in cross-section, of an improved separator of the present invention.
Figure 3:
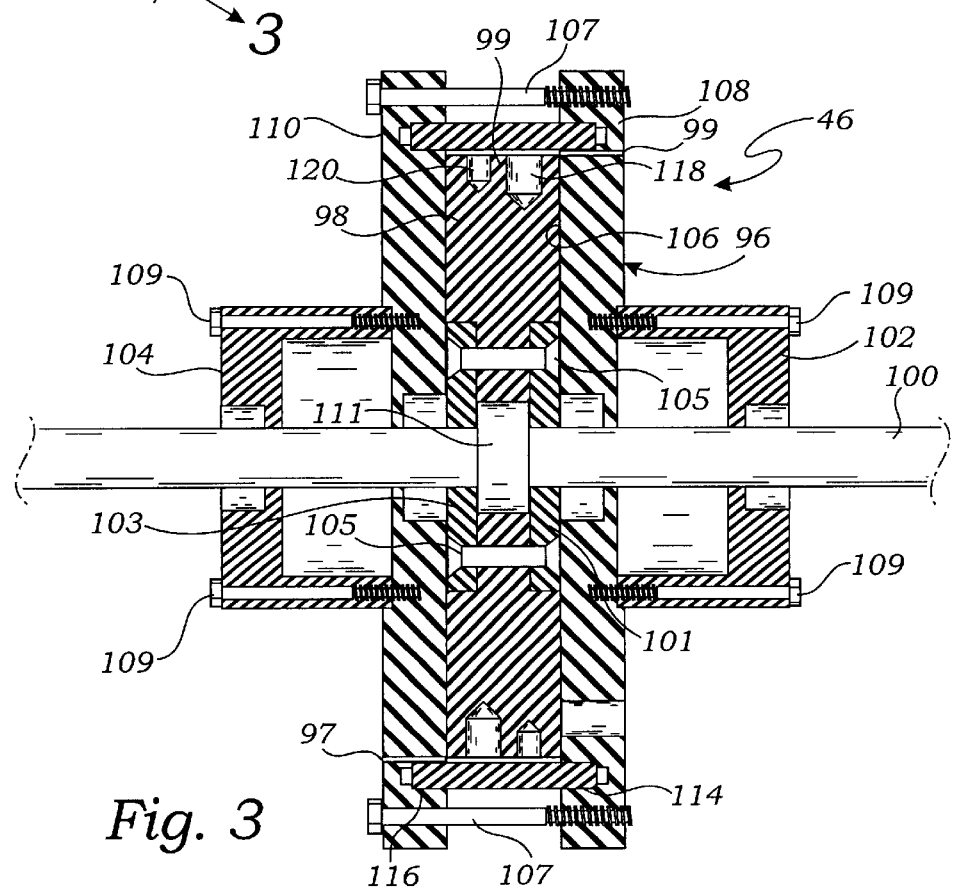
FIG. 3 is a cross-sectional view, taken along line 3—3 of FIG. 2.

Fluid from the circulation tanks 28 is pulled through a further outlet to a line 42 by a pump 44 and fed into an inlet of a separator 46. The separator 46 may be of the type set forth in the Griggs '090, '298 or '122 patents discussed above, or may be of an improved type as shown in FIGS. 2 and 3 and described more fully below. In any case, the separator 46 is actuated at high speed by a motor 48, which motor may include belts, pulley, chains, couplings, a transmission or the like, to control the speed of a rotor within the separator.

The high speed movement of a rotor within the separator 46 both heats and purifies the aqueous solution therein, preferably by shearing the aqueous solution at the molecular level to produce purified gas, such as steam. Any impurities remaining in the separator 46 are removed as necessary. By using a vacuum in the system 10, after the separator 46, as explained more fully below, the system produces greater through-put of approximately 24 times as much as known systems. For example, 60 GPH with the present system as opposed to 2.5 GPH with a system such as the Griggs patents.

The steam is drawn through an outlet in the separator 46 into line 50 to a second three-way valve 52. The steam passes through a flow meter 54, a conductivity meter 56 and a temperature sensor or switch 58 held in line 50, before reaching the three-way valve 52. The three-way valve 52 splits the steam and directs this steam, via lines 60 and 62, into two inlet ports at opposite ends of a first heat exchanger 64, where at least some of the steam is condensed to a purified fluid. A first outlet port of the first heat exchanger 64 is connected to a line 66 that is connected to the circulation tank 28 to allow any steam and heated purified fluid to mix with the raw aqueous fluid in the circulation tank. A second outlet port of the first heat exchanger is connected to a line 68 that leads to a second inlet port in the second heat exchanger 20 to allow heat to be applied to the water coming from line 30 and exiting at line 18.

A second outlet of the second heat exchanger 20 is connected to a line 70 connected to a venturi 72, which pulls the purified fluid via a vacuum formed in the venturi. The venturi 72 is fed fluid from a purified fluid holding or product tank 74 through a filter 76 by a pump 78. The pump 78 is activated by a low-level sensor or switch 80 in holding tank 74 and is shut off by a high-level switch 82. The purified fluid from line 70 and filter 76 meet and mix within the venturi 72 to operate the same and exit the venturi through an outlet connected to a line 84 that feeds the fluid back into the holding tank 74. The purified fluid from holding or product tank 74 is selectively fed to a system, as needed, through an outlet connected to a line 86, controlled by a control valve 88.

Condensate or steam from circulation tank 28 enters the line 90 from the still further outlet in the top of the circulation tank and passes through a secondary condenser 92. After being condensed in the secondary condenser 92, purified fluid is fed through line 94 to a further inlet in holding or product tank 74.

Therefore, it can be seen that the system 10 of the present invention provides an improved process and method of purifying large quantities of impure aqueous solution, such as water, in a more efficient manner.

The method and system of the present invention produces vastly superior results when compared to known systems, and is improved even further by the use of the novel separator 46, as shown in FIGS. 2 and 3. The separator 46 includes a housing 96 having a rotor or wheel 98, an inlet 97 and an outlet 99. The rotor 98 is preferably cylindrical and of a predetermined diameter and thickness, depending on the needs of the system in which it is held. The rotor is mounted or secured on a shaft 100 held in a pair of bearing means 102, 104 at opposed ends thereof. The rotor 98 is preferably closely held in an inner chamber 106 formed by cylindrical end plates 108, 110 and a cylindrical shell 112. The cylindrical end plates 108, 110 include annular apertures 114, 116 formed in opposed sides thereof and the shell 112 is sized and dimensioned to fit snuggly into the annular apertures 114, 116 to form a sealed inner chamber 106. Sealing means may be provided in the apertures 114, 116, as needed. The end plates 108, 110 with the shell 112 held in the annular apertures are sealingly held or sandwiched together by a plurality of securing elements 107, such as bolts or screws, passing through and secured in openings formed in the end plates.

The bearing means 102, 104 are secured to outside surfaces of the end plates 108, 100 by securing elements 109, passing through holders for the bearings and secured in the end plates.

The cylindrical rotor 98 includes a plurality of different size orifices 118, 120 formed on an exterior surface on the outer periphery 99. As shown, the different size orifices 118, 120 are of different diameters and depths and are uniformly spaced in a staggered relationship around the entire exterior surface 99.

The cylindrical rotor 98 is securely mounted or fixed to the shaft 100 in any desired manner, as for example by means of a pair of holding plates 101, 103 held by securing means 105. The holding plates are clamped or secured to an enlarged annular portion 111 secured to or formed integrally with the shaft 100. The shaft 100 is rotated at high speed by motor 48, directly or through other means to cause severe turbulence and molecular shearing action to the aqueous fluid held in internal chamber 106, to purify the aqueous solution.

The housing 96 and rotor or wheel 98 may be of any desired shape and size, provided that they are sized and dimensioned to work together most efficiently. In one preferred embodiment of the invention superior results were obtained utilizing a 12 HP motor rotating a rotor approximately 10" in diameter and 2.125" thick. The shaft 100 was approximately 2" in diameter, and in addition to the holding plates 101, 103, included a key held in a keyway formed in holding plates and an inner portion of the rotor. The openings 118 and 120 were approximately 0.75" in diameter and 0.62" deep and 0.25" in diameter and 0.18" deep. Finally, the clearance between the outer surface 99 of the rotor 98 and the interior surface of the shell 112 is approximately 0.12".

Those skilled in the art will appreciate that various adaptations and modifications of the just-described preferred embodiments may be configured without departing from the scope and spirit of the invention. Therefore, it is to be understood that, within the scope of the appended claims, the invention may be practiced other than is specifically described herein.

What is claimed is:

1. A fluid purifying system for removing impurities from an aqueous solution, comprising:
   a preheat tank having an inlet for receiving an impure aqueous solution;
   a circulation tank having an inlet for receiving at least some of the impure aqueous solution from an outlet of the preheat tank;
   a pump connected to an outlet of the circulation tank;
   a separator having an inlet connected to the outlet of the pump;
   a motor means for operating the separator;
   an outlet from the separator connected to a heat exchanger;
   the heat exchanger connected to a venturi; and
   a purified aqueous solution holding tank for collecting the purified aqueous solution for further use.

2. The fluid purifying system of claim 1 wherein the outlet of the preheat tank is connected to a three-way valve for diverting some of the impure aqueous solution to a further heat exchanger.

3. The fluid purifying system of claim 2 wherein the circulation tank includes a second outlet for waste and a third outlet connected to an inlet of a secondary condenser.

4. The fluid purifying system of claim 3 wherein the secondary condenser has an outlet connected to the purified aqueous solution holding tank.

5. The fluid purifying system of claim 4 wherein the heat exchanger and the further heat exchanger are connected together.

6. The fluid purifying system of claim 1 wherein there are a pair of heat exchangers connected in series with a first of the pair of heat exchangers connected to a three-way valve connected to the separator and a second of the pair of heat exchangers connected to a further three-way valve connected to the outlet of the preheat tank.

7. The fluid purifying system of claim 6 wherein the second of the pair of heat exchangers has an outlet connecting the second of the pair of heat exchangers to the holding tank.

8. The fluid purifying system of claim 7 wherein the venturi is connected to the second of the pair of heat exchangers and a further pump connected to an outlet from the purified solution holding tank.

9. The fluid purifying system of claim 1 wherein the separator includes a housing having a rotor therein; and the rotor includes a plurality of different depth and width orifices formed on an outer surface thereof.

10. The fluid purifying system of claim 9 wherein the housing is formed form a shell held in opposed annular opening formed in a pair of end plates clamped together with the shell.

11. The fluid purifying system of claim 10 wherein the plurality of different depth and width orifices are uniformly formed on the outer surface in a staggered array.

12. A method of purifying an aqueous solution comprising the steps of;
   feeding impure aqueous solution into a preheat fluid tank;
   pumping the impure aqueous solution from the preheat fluid tank into a circulation tank and then into a separator;
   operating the separator to remove all remaining impurities from the aqueous solution;
   taking the purified aqueous solution from the separator and passing the purified aqueous solution through at least one heat exchanger; and
   passing the purified aqueous solution through a venturi into a purified aqueous solution holding tank.

13. The method of claim 12, further including the step of splitting the aqueous solution exiting from the preheat fluid tank into two streams and directing one of the streams to a second heat exchanger, connected in series with the at least one heat exchanger.

14. The method of claim 13, further including the step of providing the circulation tank with an outlet for waste and an outlet leading to a secondary condenser.

15. The method of claim 14, further including the step of connecting the secondary condenser to the purified aqueous solution holding tank.

16. The method of claim 15, further including pumping purified aqueous solution from the purified aqueous solution holding tank through the venturi and back into the purified aqueous solution holding tank.

17. A separator for purifying water, having a housing with an inlet and an outlet, comprising:
   a cylindrical shell;
   a pair of end plates having annular openings on opposed sides;
   a plurality of securing elements holding the pair of end plates and the shell together with the shell sealingly held in the annular openings;
   an internal chamber formed between interior surfaces of the pair of end plates and the shell;
   a cylindrical rotor having an outer surface with a plurality of different size orifices formed therein;
   the cylindrical rotor being removably secured to a shaft, which shaft sealing extends through the pair of end plates;
   a pair of shaft bearing elements secured to outer surfaces of the pair of end plates and rotatably holding the shaft; and
   a motor means for rotating the shaft and the rotor.

18. The separator of claim 17 wherein the plurality of different size orifices are different in depth and width and are uniformly spaced around the entire periphery of the rotor in a staggered relationship.

19. The separator of claim 18 wherein the pair of shaft bearing elements are secured to the outer surfaces of the pair of end plates by securing elements passing into and held in the outer surfaces.

20. The separator of claim 19 wherein the shaft includes an enlarged annular portion and the rotor is secured to the shaft by means of a pair of holding plates secured together and to the rotor around the enlarged annular portion.

* * * * *